April 7, 1970    E. L. COE, JR    3,504,479
PRECIPITATOR CONTROL APPARATUS
Filed March 29, 1967    2 Sheets-Sheet 1
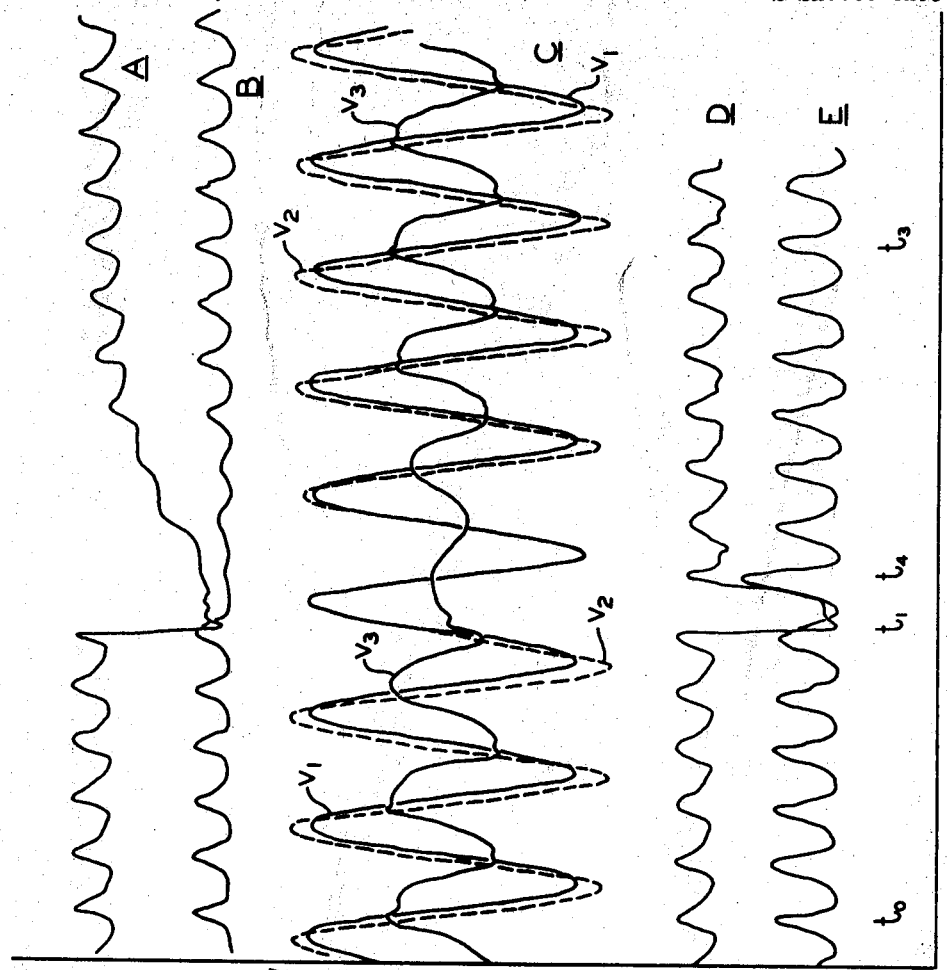
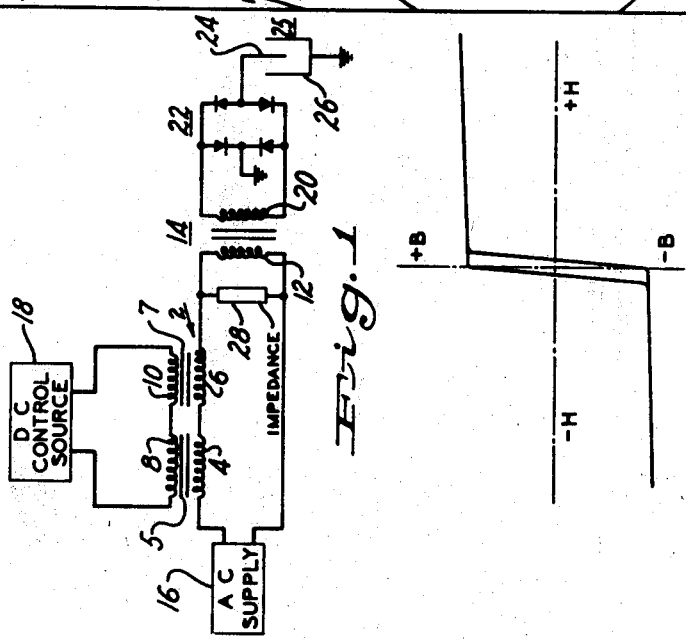
INVENTOR.
EVERETT L. COE JR.

INVENTOR.
EVERETT L. COE JR.

United States Patent Office 3,504,479
Patented Apr. 7, 1970

3,504,479
PRECIPITATOR CONTROL APPARATUS
Everett L. Coe, Jr. 9514 E. Fostoria St.,
Downey, Calif. 90241
Filed Mar. 29, 1967, Ser. No. 626,772
Int. Cl. B03c 3/02; H02m 1/08
U.S. Cl. 55—2                                    15 Claims

ABSTRACT OF THE DISCLOSURE

A control apparatus and a method for controlling the energy used to recharge an electrostatic precipitator after a spark has occurred having switching means controlled to permit recharging of the precipitator in a time period substantially equivalent to the time between energy pulses supplied to the precipitator under normal operation when no sparking has occurred, to minimize the disruption of dust collection after sparking.

---

It is well known that the electrical power requirements for operating an electrostatic precipitator are largely dependent upon the conditions of the gas and dust being treated. When a spark occurs in the precipitator, substantially all of the electrical energy stored in the high voltage portion thereof is rapidly discharged through the spark, except for a small amount of energy residing on the dust particles. For most efficient dust collection, it is necessary that the precipitator be recharged to normal or full operating voltage that existed before the spark occurred as soon as possible after the spark has extinguished. Should it require an appreciable number of cycles at the input alternating current source frequency for the precipitator to be recharged to its full operating voltage, a substantial quantity of untreated gas and dust may escape into the atmosphere. A portion of the energy needed to recharge the precipitator to normal operating voltage after sparking is fixed by the physical size and configuration of the precipitator itself; however, the remainder of the energy required is a variable quantity which depends in part upon the dust particle content of the gas stream.

Presently known precipitator control systems are designed to control the energy delivered to operate the precipitator between sparks, but no unique provisions are made for controlling the energy delivered to recharge the precipitator once sparking has occurred. Depending upon the gas and dust conditions in the precipitator, the amount of energy required to recharge the precipitator after sparking for optimum dust collecting efficiency may vary widely. It is therefore apparent that it would be very advantageous to control the amount of energy available for recharging the precipitator after sparking in order to effect optimum dust collection efficiency. By properly controlling the energy delivered to recharge the precipitator after sparking, the undesired conditions of providing either insufficient or excessive energy, which delay the resumption of efficient dust collection, can be avoided.

Basically, the present invention provides new and improved control aparatus and method for controlling the recharging of a precipitator after sparking wherein: the time at which the supply of energy is initiated supplied from an input alternating source is controlled so that the total amount of energy delivered recharges the precipitator substantially to full operating potential, as established by the normal energy supplying rate when sparking has ocurred in the immediately preceding time period.

The objects and advantages of the present invention will become more apparent when considered in view of the following specification and drawings in which:

FIG. 1 is a schematic diagram of one embodiment of the present invention;

FIG. 2 is a plot of a square-loop hysteresis characteristic used in explaining the operation of the embodiment of FIG. 1;

FIG. 3 is a waveform diagram including curves A, B, C, D and E used in explanation of the operation of the present invention.

Figure 4:
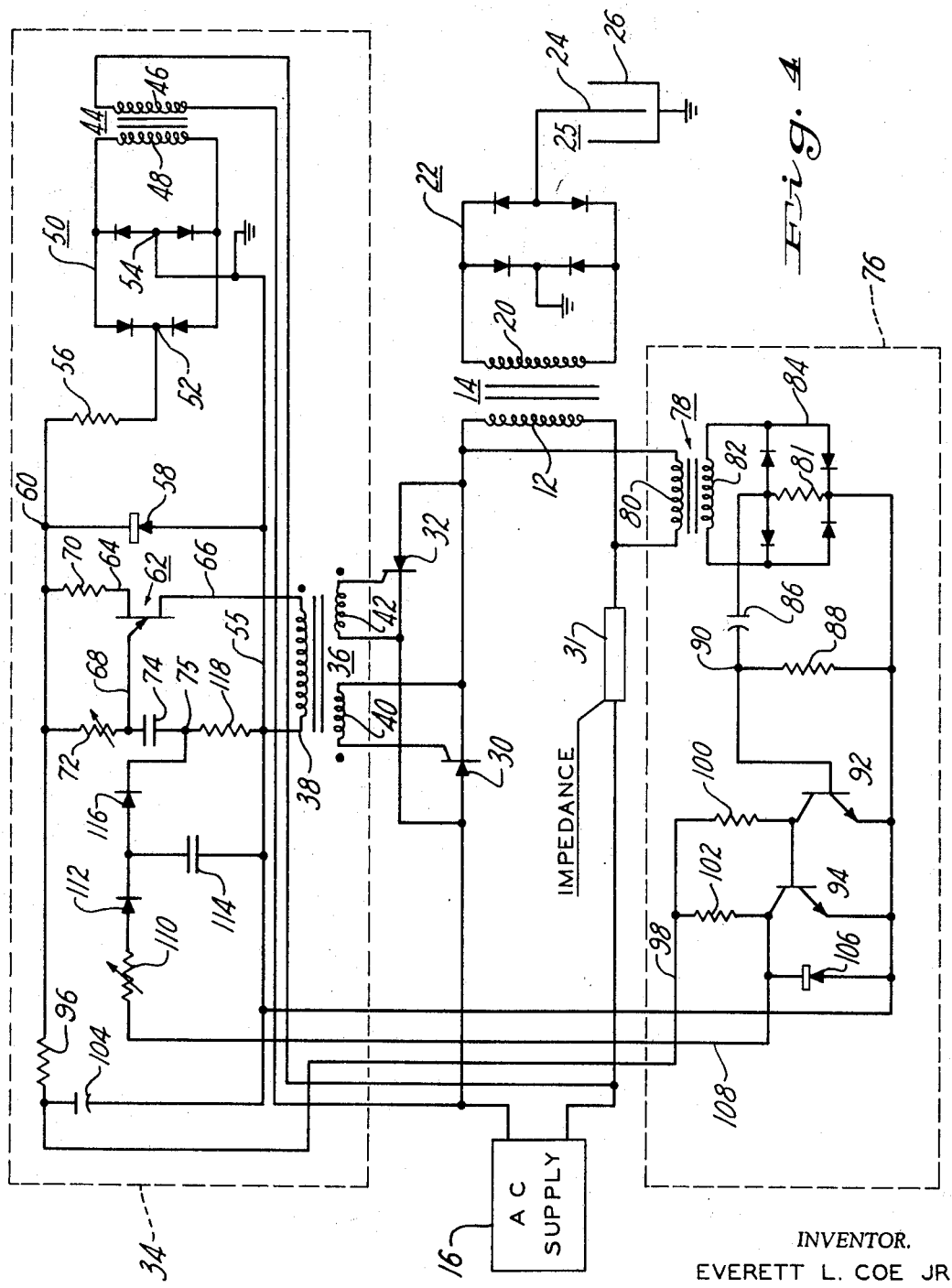
FIG. 4 is a schematic diagram of a preferred embodiment of the present invention.

Referring to FIG. 1, such embodiment of the present invention is shown utilizing a saturable reactor 2 as the control element of the precipitator system shown schematically thereon. The saturable reactor 2 includes a pair of alternating current windings 4 and 6, which are connected in series, and a pair of direct current windings 8 and 10, which are connected in series. Separate cores 5 and 7 are provided, respectively, for the windings 4–8 and the windings 6–10. It is to be understood that the separation of cores 5 and 7 is for purposes of electrical representation, and physical separation in actual construction may or may not exist. The primary winding 12 of a step-up transformer 14 is connected in series with the AC windings 4 and 6 of the saturable reactor 2. An alternating current supply 16 is connected across the series connection of the windings 4, 6 and 12. The alternating current supply 16 may provide a sinusoidal output waveform of a predetermined voltage and frequency, for example, 60 cycles per second. A DC control source 18 is connected across the DC windings 8 and 10 and supplies direct current thereto for setting the bias level of the saturable reactor 2. The high voltage secondary winding 20 of the step-up transformer 14 is connected across a diode bridge 22 which includes four diodes connected in a standard full-wave rectifying bridge circuit. The output of the diode bridge 22 is a high amplitude negative polarity voltage with respect to ground, and is applied to a precipitator discharge electrode system 24 of an electrostatic precipitator 25 having a collecting electrode system 26 connected to ground potential. An impedance element 28 is connected across the primary winding 12 of the step-up transformer 14 and illustratively comprises a variable resistor.

The saturable reactor 2 is utilized as a switching device to control the amount of energy supplied from the AC source 16 therethrough to the step-up transformer 14 through the bridge array of diodes 22 to the precipitator 25. The core material of the saturable reactor 2 is selected to have approximately a square-loop hysteresis or B–H characteristic such as shown in FIG. 2. The saturable reactor 2 is of a construction such that, in the absence of a DC current being supplied to the DC windings 8 and 10 from the DC control source 18, the alternating voltage output from the AC supply 16 is insufficient to drive the saturable reactor 2 from its high impedance unsaturated state to its low impedance saturated state. By the application of sufficient DC control current from the DC control source 18 to the windings 8 and 10, the saturable reactor 2 is biased so that at some time in each half cycle of the alternating waveform the saturable reactor 2 will be switched to its low impedance saturated state and thus permit the passage of current from the alternating source 16 for the remainder of the half cycle therethrough. The windings 8 and 10 are so poled that the application of direct current from the DC control source 18 therethrough causes one of the cores to be biased toward positive saturation, while the other core is biased toward negative saturation. Thus, at some time during the positive and negative half cycles of the input alternating waveform the saturable reactor 2 is driven into saturation and its low impedance state so as to permit the passage of current therethrough. The point in the input alternating half cycle at which the saturable reactor 2 is switched to its low impedance state is dependent upon the magnitude of the control current supplied by the DC control source 18 to the DC windings 8 and 10. By increasing the DC current applied to the windings 8 and 10, the time required for the saturable reactor 2 to be driven into its low impedance state may be decreased to permit the passage of a larger portion of the positive and negative half cycle of the input waveform therethrough and thus increase the magnitude of energy delivered to the precipitator system 25. By the proper setting of the DC control current supplied by the DC control source 18 to the windings 8 and 10, the point in the positive and negative half cycle for the switching of the reactor 2 to its low impedance state can be set to establish the desired normal operating conditions of the precipitator system 25.

Curve A of FIG. 3 shows a plot of the precipitator voltage in the circuit of FIG. 1 with the impedance element 28 disconnected from across the primary windings 12. In such a circuit, between the times $t_0$ and $t_1$, the precipitator voltage is shown to be at its normal operating voltage level with the precipitator being brought up to peak voltage by a pulse of energy during each half cycle of the voltage from the alternating supply 16 when the saturable reactor 2 switches to its low impedance state. Any loss of energy in the system is thus replenished during each of the half cycles of alternating current input. Curve B of FIG. 3 shows the precipitator current. A plot of the supply voltage provided by the AC supply 16 is shown in curve C of FIG. 3 as the curve $V_1$. Also in curve C of FIG. 3, the voltage waveform across the reactor windings 4 and 6 is shown as the curve $V_2$, and the voltage across the primary winding is shown as the curve $V_3$.

During the time period when a spark has not recently occurred at the precipitator 25, such as during the time period $t_0$ to $t_1$, the discharge electrode 24 of precipitator 25 will be at high voltage with respect to the collecting electrode 26 and little current will be drawn from the secondary circuit of the transformer 14 because of the high voltage on the electrode 24 preventing conduction through the rectifier bridge 22 during a portion of each half cycle. The impedance of the transformer 14 as seen at the secondary winding 20 will thus be a high impedance which will be reflected across the transformer 14 to the primary winding 12 thereof. The secondary winding 20 is thus effectively disconnected from the primary winding 12 under the operating conditions described and will appear as an open circuit to the primary winding 12 during a portion of each half cycle. The input voltage from the AC supply 16 divides between the AC windings 4 and 6 of the saturable reactor 2 and the primary winding 12 because of the high average impedance appearing thereacross. The apportionment of the supply voltage is dependent in part upon the ratio of the unsaturated impedance of the reactor AC windings 4 and 6 compared to the open circuit impedance of the primary winding 12 when the precipitator system 25 is at its high voltage state between sparks.

At the time $t_1$ in FIG. 3, a spark occurs and the energy of precipitator 25 is dissipated therein, with the voltage appearing at the electrode 24 suddenly dropping essentially to ground potential as can be seen in curve A of FIG. 3. The discharge of the precipitator 25 dissipates the energy in the high voltage system of the precipitator system circuit with the precipitator 25 appearing as essentially a short circuit to ground. A low impedance thus appears across the secondary winding 20 of the transformer 14 which is reflected as a low impedance to the primary winding 12 thereof. During the next half cycle of voltage from the AC supply 16, the voltage from the AC supply 16 will divide between the AC windings 4 and 6 and the primary winding 12, with substantially all the voltage appearing across the windings 4 and 6 because of the reflected low impedance appearing across the primary winding 12. It can therefore be seen that nearly the full AC supply voltage is available to saturate the saturable reactor 2 during the half cycle of the input waveform immediately following the spark, whereas, at other times the portion of the supply voltage available to saturate the saturable reactor 2 is modified by the voltage appearing across the impedance of the primary winding 12. The effect of this can be seen in curve C of FIG. 3 wherein the source voltage $V_1$, the reactor voltage $V_2$ appearing across the windings 4 and 6 and the primary voltage $V_3$ appearing across primary winding 12 are plotted.

During the time period $t_0$ to $t_1$, the primary voltage $V_3$ is a relatively high value; however, immediately after the time $t_1$, this voltage $V_3$ is substantially diminished as can be seen in curve C of FIG. 3. Due to the lack of control as to how the voltages are divided between the saturable reactor windings 4 and 6 and the primary winding 12, the precipitator voltage does not reach its normal operating potential, as can be seen by curve A of FIG. 3, until a number of cycles of the input waveform has occurred. In curve A of FIG. 3, the precipitator does not reach normal operating voltage until a time $t_3$ after 8 pulses of energy have been provided thereto. During the time period $t_1$ to $t_3$, normal operation of the precipitator 25 is disrupted, thus causing inefficient dust collection.

Considering now the case with the impedance element 28 connected across the primary winding 12 of the transformer 14, the advantages of the control system of FIG. 1 may be seen. By varying this impedance, which is seen across the primary winding 12 of the transformer 14, the relative timing of a power impulse following a spark at the precipitator 25 may be varied with respect to the timing of normal power delivery impulses.

The manner in which the impedance element 28 is selected in order to provide highly efficient operation precipitator system will now be considered. The impedance 28 is selected to have a low value of impedance as compared to the impedance of the AC windings 4 and 6 of the saturable reactor 2 when both of the cores 5 and 7 of the reactor 2 are in their unsaturated state, that is, when they present a relatively high impedance. The impedance 28 being so selected then the impedance reflected across the primary winding 12 from the secondary of the transformer 14 will have substantially no effect upon the voltage available to the AC windings 4 and 6 of the reactor 2 during their unsaturated period. With the impedance 28 being so chosen, then under all circumstances, that is, when no spark has recently occurred or when a spark has just occurred, substantially all of the AC supply voltage will be impressed across the AC windings 4 and 6 of the reactor 2 during its unsaturated period. Therefore, the time from the end of a spark current surge to the saturation of the reactor 2 to deliver a recharge pulse impulse is substantially the same as the time between power impulses under normal power delivery between sparks.

In the present system the primary winding 12 is selected to have a high impedance relative to the unsaturated impedance of the AC windings 4 and 6; thus increasing the value of the impedance 28 across the primary winding 12 will not change the voltage available to the windings 4 and 6 of the reactor 2 after a spark has occurred because of the reflected low impedance across the primary winding 12. However, the increased value of the impedance 28 will decrease the voltage available to the reactor windings 4 and 6 between normal power impulses because more voltage will appear across the impedance 28 when it is of a higher value than when it is at a lower value. To compensate for less voltage being available to the AC windings 4 and 6 and to still provide the same timing between normal power impulses, the DC control current provided by the DC control source 18 to the DC windings 8 and 10 is increased to such a value as to provide the desired timing of normal power impulses with the less available voltage to the AC windings 4 and 6.

With the increased DC current in the windings 8 and 10 so biasing the reactor 2 after a spark has occurred in the precipitator 12 and with substantially the full AC supply voltage being available to the AC windings 4 and 6, saturation of the reactor 2 will be accomplished in a shorter time than the normal time and a recharge power impulse will be initiated earlier in the half cycle of the input waveform. Thus, after a spark has occurred, substantially full AC voltage will be available to the AC windings 4 and 6 of the saturable reactor 2 since the primary winding 12 is essentially short circuited. This will cause the saturable reactor 2 to be saturated earlier in the half cycle of the AC input waveform which will permit energy to be translated therethrough and thus supply more energy for recharging the precipitator than would be the case without the impedance 28 in the circuit since an increased DC control current is also provided to the saturable reactor 2 by reason of its having set to obtain the desired normal energy delivery as described above. By so constructing the circuit as discussed above, the time required for recharging the precipitator 25 to full normal operating potential can be minimized as can better be seen by reference to curves D and E of FIG. 3.

Curve D of FIG. 3 shows the precipitator voltage at normal operating voltage between the times $t_0$ and $t_1$. At the time $t_1$ a spark occurs with the precipitator voltage suddenly falling substantially to ground potential. Curve E shows the corresponding precipitator current. In curve D of FIG. 3 it can be seen, however, that the precipitator voltage has increased substantially to normal operating voltage within the next half cycle of the alternating waveform. This is accomplished by the operation of the circuitry of FIG. 1 so that the saturable reactor 2 will be saturated earlier in the half cycle than is the normal saturation time after sparking. Hence more energy is supplied therethrough to provide sufficient recharging energy for the precipitator and therefore recharges it in a lesser period of time. As shown in curve D of FIG. 3, even though a spark has occurred at time $t_1$, the precipitator 25 is again operating at normal operating voltage at time $t_4$, which is during the next half cycle of the input waveform from the AC source 16. Accordingly, the time period during which the precipitator is not operative for collecting dust has been minimized, and a highly efficient cycle of operation is thus provided by the apparatus as shown in FIG. 1.

To provide the highly efficient mode of operation as described above the selection of circuit components may be summarized as follows: The primary winding 12 is selected to have a high impedance measured with the secondary winding 20 open circuited in comparison to the impedance of the AC windings 4 and 6 of the saturable reactor 2 measured when both of the cores of this reactor are in their unsaturated state; and, by connecting the impedance 28 across the primary winding 12 and so adjusting this impedance so that the relative timing of the recharged power delivery impulse with respect to normal power delivery impulse is such that the desired amount of energy is delivered to the precipitator 25 after sparking of the precipitator 25 to return the precipitator 25 to full operating voltage within a minimum time period, and, with the control described, within the next half cycle of the alternating current input for optimum operating efficiency.

A comparison of curves A and D of FIG. 3 shows the advantages and increased efficiency affected through the described selection of components and operating conditions. The impedance element 28 may comprise a resistor, and it has been found that a resistor having values of 5 to 100 times the rated impedance of the transformer 12 may be advantageously utilized.

FIG. 4 shows another embodiment of the present invention wherein semiconductor switching devices are utilized to control the time at which energy pulses are supplied to the precipitator. As shown in FIG. 4, the connection of the transformer 14, including primary winding 12 and secondary winding 20, the rectifier bridge 22 and precipitator 25 are the same as shown in FIG. 1. Between the AC supply 16 and the primary winding 12 is connected a pair of semiconductor switching devices, which are shown as silicon controlled rectifiers 30 and 32. Even though FIG. 4 will be discussed with respect to silicon controlled rectifiers, it should be understood that other switching devices, such as transistors, gate controlled switches, thyratrons, etc., could be utilized in place thereof. The controlled rectifiers 30 and 32 are oppositely connected with respect to each other so as to permit the bilateral passage of current between the source 16 and the primary winding 12. Thus, the anode electrode of each of the controlled rectifiers is connected to the cathode electrode of the other of the controlled rectifiers. The anode-cathode connection of the controlled rectifiers 30 and 32, respectively, is connected to the AC source 16, and the cathode-anode connection of the controlled rectifiers 30 and 32, respectively, is connected to the primary winding 12 of the step-up transformer 14. An impedance element 31, which may comprise a fixed inductance is connected between the bottom end of the primary winding 12 and the AC supply 16 to act as a current limiter to prevent possible damage to components of the circuitry. The impedance element 31 is shown as a separate component but may be included in the impedance of the primary winding 12 if desired.

A gate control circuit, indicated by the dotted block 34, is provided in order to supply gating pulses to the gate electrodes of the controlled rectifiers 30 and 32. Included within the gate pulse circuit 34 is an impulse transformer 36 which includes a primary winding 38 and a pair of secondary windings 40 and 42. The secondary winding 40 is connected between the gate and cathode electrodes of the controlled rectifier 30, and the secondary winding 42 is connected between the gate and cathode electrodes of the controlled rectifier 32. The windings 38, 40 and 42 have a dot convention as shown in FIG. 4 so that the energization of the primary winding 38 by the application of current to the dotted end thereof applies a positive polarity gating pulse to each of the gate electrodes of the controlled rectifiers 30 and 32. Depending upon the half cycle of the waveform of the AC supply 16 one or the other of the controlled rectifiers 30 or 32 will have its anode electrode rendered positive with respect to its cathode and will thereby be conductive. The other of the controlled rectifiers, however, even though a gating pulse is applied thereto, will be reverse biased and will not conduct current until gated on during the next half cycle of the input alternating waveform of the AC supply 16. By controlling the time in the cycle of the input AC waveform that the controlled rectifiers 30 or 32 are gated on, the amount of energy translated therethrough to be supplied to the precipitator 25 can be controlled.

For a normal operating cycle of the precipitator apparatus between sparking, the gating pulses for the controlled rectifiers 30 and 32 are generated as follows. The gate control circuit 34 receives as an input thereto an alternating current waveform which has a predetermined phase relationship with respect to the alternating output of the AC supply 16. This is conveniently provided by a transformer 44 whose primary winding 46 is connected across the AC supply 16. The secondary winding 48 of the transformer 44 is connected across a full wave rectifying diode bridge 50. Thus across the output terminal points 52 and 54 of the diode bridge 50 a full wave rectified unidirectional output is provided. Connected in series between the output points 52 and 54, is a resistor 56 and a Zener diode 58, with a junction point 60 being formed therebetween. The anode of the Zener diode 58 is connected to the point 54 at ground. A Zener diode has the characteristic that it presents a high impedance from cathode to anode until a predetermined Zener voltage is reached. At this time, the Zener conducts and maintains its predetermined Zener voltage. The component values are so selected that the Zener voltage of the Zener diode 58 is exceeded during each half cycle of the waveform applied to the transformer 44. The voltage developed between the junction point 60 at the cathode of the Zener diode 58 and the point 54 at the anode thereof will first rise to the Zener voltage; this voltage will be maintained until the half cycle nears its end when the voltage thereacross drops below the hold value of the Zener 58 and the voltage goes to zero. The other portion of the voltage developed between the points 52 and 54 will appear across the resistor 56 in series with the Zener 58. During each half cycle of the input alternating waveform, the voltage between the junction point 60 and the point 54 thus rises from zero to the Zener voltage of the Zener 58, maintains this value for a time period and then returns to zero as the half cycle ends.

A unijunction transistor 62 is provided to act as the switching element for the gate control circuit 34. The unijunction transistor 62 includes a first base 64, a second base 66 and an emitter 68. A resistor 70 is connected between the first base 64 and the junction point 60. The second base 66 is connected to the dotted end of the winding 38 of the impulse transformer 36, the undotted end of the winding 38 being connected to ground. A variable resistor 72 is connected between the point 60 and the emitter electrode 68 of the unijunction transistor 62. Also one end of a capacitor 74 is connected to the emitter electrode 68.

Assume for the purposes of explanation, that the other end of the capacitor 74 at a junction point 75 is connected directly to ground and disregard for the time being the other components to the left of the unijunction transistor 62. The unijunction transistor 62 is operative so that substantially no emitter-to-second base current flows until the emitter-to-second base voltage reaches a predetermined percentage of the base-to-base voltage. For a typical unijunction transistor, the emitter-to-second base voltage must be approximately 60% of the base-to-base voltage for emitter-to-second base current to flow. When this occurs there is heavy conduction of the emitter 68 to the second base 66 until the voltage of the emitter 68 has fallen to a small percentage of the base-to-base voltage.

When voltage first appears between the point 60 and ground, still assuming that the bottom of the capacitor 74 is grounded, the capacitor 74 will be in a discharged state so that the emitter 68 of the unijunction transistor 62 will have substantially no voltage applied thereto. As the voltage at the point 60 increases, the capacitor 74 begins to charge through the variable resistor 72 with the voltage at the emitter 68 of the unijunction transistor 62 thus increasing. In a period of time determined by the value of the resistor 72 and the capacitor 74, the voltage at the emitter 68 with respect to the second base 66 reaches a value at which conduction commences between the emitter 68 and the base 66. At this time the capacitor 74 discharges through the emitter-second base circuit of the unijunction transistor 62. The impulse resulting from the rapid discharge of the capacitor 74 through the emitter-base circuit of the unijunction transistor 62 is applied to the primary winding 38 of the impulse transformer 36. This impulse by transformer action is applied to the gate windings 40 and 42, which will, respectively, gate on the controlled rectifiers 30 and 32. One of the controlled rectifiers 30 and 32 will have its anode positive with respect to its cathode at this time and will thereby translate current therethrough from the AC source 16 to the step-up transformer 14. By adjusting the value of the variable resistor 72, the time in the input cycle at which the controlled rectifiers 30 and 32 are gated on may be controlled. The value of the variable resistor 72 is thus selected to provide the precipitator apparatus with sufficient energy to permit operation at the normal operating voltages during the normal non-sparking portions of the precipitator operation. It is understood that the function described herein as performed by resistor 72 may be accomplished by other means permitting manual or automatic setting of the input power level to the precipitator.

The normal time in the input cycle at which the gate controlled rectifiers 30 and 32 are rendered conductive having been established it is necessary that provision be made so that the time at which the controlled rectifiers are gated on be advanced when a spark occurs in the precipitator 25 and provide sufficient recharging energy to the precipitator 25 in a minimum time period, preferably within the next half cycle of the input source 16 waveform.

A spark recognition circuit 76 is provided which senses when a spark occurs in the precipitator 25 and, in response thereto, provides an output voltage of predetermined amplitude and duration which is applied as an input to the gate controlled circuit 24 to control thereby the time at which the gate control circuit 34 gates on the controlled rectifiers 30 and 32. The spark recognition circuit 76 includes a tranformer 78 which has its primary winding 80 connected across the primary winding 12 of the step-up transformer 14. The secondary winding 82 of the transformer 78 is connected across a full wave diode bridge 84. Connected between the output points of the diode bridge 84 is a resistor 81 and a series circuit including a capacitor 86 and a resistor 88. The junction point 90 between the capacitor 86 and the resistor 88 is connected to the base electrode of a transistor 92. The transistor 92 and a transistor 94 form the active elements of an amplifying circuit. Operating voltage for the amplifier transistors 92 and 94 is developed within the gate control circuit 34 by the connection of a resistor 96 between the junction point 60 and a lead 98, which is connected to the collector electrodes of the transistors 92 and 94, respectively, through resistors 100 and 102. A filter capacitor 104 is connected between the lead 98 and the ground in order to filter the full wave rectified output as applied to the resistor 96 from the point 60.

Under normal operating conditions of the precipitator 25, between the occurrence of sparks, the waveform of the voltage appearing across the primary winding 12 of step-up transformer 14 is substantially a sinusoidal one at a frequency of, for example, 60 cycles per second. The capacitor 86 in series with the base of the transistor 92 is so selected to block signals of this low frequency from being applied therethrough. In other words, the capacitor 86 is selected to have a high impedance with respect to signals of the input frequency.

When, however, a spark occurs in the precipitator 25, the secondary winding 20 and thus the primary winding 12 of winding 14 are essentially short circuited with the voltage across the primary winding 12 abruptly falling substantially to zero. The sudden drop of voltage across primary winding 12 is sensed by the primary winding 80 of the transformer 78 and is transformed to the secondary winding 82 thereof as a pulse voltage. The pulse appearing at the secondary winding 82 is rectified in the diode bridge 84 and applied to the capacitor 86. Because of the sudden drop of voltage across the winding 80 the pulse applied to the capacitor 86 is of a high frequency as compared to the frequency of the AC supply 16. The capacitor 86 passes the pulse therethrough substantially unattenuated since is presents a relatively low impedance at the frequency of the pulse. The pulse is then applied to the base of the transistor 92. Because of the polarity of the diodes in the diode bridge 84, the pulse translated through the capacity 86 will be of a positive polarity with respect to the ground to which the emitter electrodes of the transistors 92 and 94 are connected. The pulse translated through the capacitor 86 and applied to the base electrode of the transistor 92 is amplified therein and applied to the base electrode of the transistor 94 which is connected to the collector electrode of the transistor 92. In the transistor 94, the pulse is additionally amplified with the output of the amplifier circuit being taken at the collector electrode of the transistor 94. Connected between the collector and emitter electrodes of the transistor 94 is a Zener diode 106 with its cathode electrode connected to the collector electrode of the transistor 94. When the output voltage at the collector of the transistor 94 with respect to the emitter electrode thereof exceeds the Zener voltage of the Zener diode 106, the Zener conducts and clamps the collector voltage with respect to emitter of the transistor 94 to the Zener voltage. The clamped voltage appears at a lead 108 and is applied as an input to the gate control circuit 34. The signal on the lead 108 will be a voltage of a predetermined amplitude due to the clamping effect of the Zener diode 106 and will be of a predetermined duration in that the pulse generated in response to the sparking of the precipitator 25 will be of a substantially constant duration for each occurrence of the spark.

The fixed amplitude and duration pulse appearing at the lead 108 is applied to one end of a variable resistor 110. The other end of the variable resistor is connected to the anode of a diode 112. The cathode of the diode 112 is connected to one end of a capacitor 114 and to the anode of a diode 116. The other end of the capacitor 114 is connected to ground. The cathode of the diode 116 is connected to the circuit point 75 at the bottom of the capacitor 74, with a resistor 118 being connected between the circuit point 75 and ground. The capacitor 74 and the resistor 118 being connected in series between the emitter 68 and the second base 66 of the unijunction transistor 62 any voltage developed across the resistor 118 will be added to the voltage across the capacitor 74. Thus, the application of current through the resistor 118 from the circuit point 75 to ground will increase the voltage from emitter 68 to second base 66 of the unijunction transistor 62 and will cause the emitter to have applied thereto a voltage of sufficient magnitude to cause conduction between emitter 68 and the second base 66 in a time period shorter than without the voltage across the resistor 118.

The signal appearing on the lead 108 is thus applied through the resistor 110 and the diode 112 to charge the capacitor 114. The charge voltage on the capacitor 114 then discharges through the diode 116 and the resistor 118 to ground. The current flow through the resistor 118 causes a voltage to appear thereacross in series with the voltage across the capacitor 74. This voltage across the resistor 118 persists for a period of time as determined by the values of the resistor 118 and the capacitor 114. The magnitude of the voltage across the resistor 118 controls the time at which the unijunction transistor 62 will be rendered conductive to discharge the capacitor 74 and apply a gating impuse through the transformer 36 to the controlled rectifiers 30 and 32. The amount of charge applied to the capacitor 114 in response to the voltage appearing on the lead 108 may be controlled by the adjustment of the variable resistor 110. Control of the amount of charge voltage on the capacitor 114 controls the magnitude of voltage developed across the resistor 118, and hence the time at which the unijunction transistor 62 conducts between emitter and second base to energize the transformer 36 and the controlled rectifiers 30 and 32. It can thus be seen that by the application of the constant amplitude and duration pulse from the spark recognition circuit 76 to the pulse generating circuit 34 that the time at which the controlled rectifiers 30 and 32 are gated on after a spark can be advanced with respect to the normal timing of the gating pulses so that sufficient energy may be translated through the controlled rectifiers 30 and 32 to recharge the precipitator system 25 in an optimum period of time, which would be during the next half cycle of the input waveform.

In the preceding discussion it has been assumed that the combination of precipitator geometry, gas and dust conditions, and electrical properties of power delivery components is such as to require adjustment of the time of initiation of a power impulse after a spark in a particular direction with respect to its time of initation during normal power delivery, and the operation of the invention has been explained with respect to this assumption. It is to be understood that other combinations are possible which could require adjustment to take place in the reverse direction from that assumed for purposes of illustration, and that such adjustments are included in this invention.

What is claimed:

1. method of electrically energizing an electrostatic precipitator comprising, maintaining a maximum operating potential between electrodes of an electrostatic precipitator during periods between occurrences of sparking thereof by controlling the energy supplied from a source of alternating current, and controlling the recharging of said precipitator to substantially a maximum operating potential after each occurrence of sparking by increasing the energy supplied to said electrodes from said source in the half cycles following the half cycles in which sparking has occurred with reference to the energy supplied to said electrodes from said source in the half cycles immediately prior to such sparking respectively.

2. The method of claim 1 wherein: said recharging to substantially a maximum operating potential after an occurrence of sparking occurs in the half cycle occurring immediately subsequent to the half cycle during which sparking of said precipitator occurred.

3. The method of claim 1 includes the steps of: sensing the occurrence of sparking in said precipitator and increasing the energy supplied thereto from said source in response thereto; and generating gating signals in response to the sensing of sparking and rendering conductive controlled switching device in at least the half cycle of the alternating current source following sparking so that increased energy is supplied as compared to the normal energy supplied between occurrences of sparking.

4. The method of claim 1 wherein: the operating potential between occurrences of sparking and after sparking are substantially equal.

5. A method of controlling the electrical energization of an electrostatic precipitator comprising: controlling the electrical energization of a rectifier by a control means energized from an alternating current source of electrical current which control means is operative during each half cycle of energization thereof to determine the instant after the initiation of each half cycle of energization at which electrical energy is supplied to said rectifier, applying the output of said rectifier to the electrodes of an electrostatic precipitator to maintain an operating potential at a desired value, obtaining an electrical quantity in said control means upon each occurrence of a spark between said electrodes during the operation of said electrostatic precipitator which quantity controls the power output of said control means, and controlling each of said quantities during the half cycle of electrical energization of said control means immediately subsequent to the half cycle in which said quantities are obtained to reestablish an operating potential between said electrodes approximately the same as the operating potential existing between said electrodes prior to the occurrence of a spark between said electrodes.

6. A method as defined in claim 5 additionally requiring controlling at least some of said quantities during additional half cycles of electrical energization after said immediately subsequent half cycle.

7. A method of controlling as defined in claim 5 in which said electrical quantity is a timing signal.

8. A method of controlling as defined in claim 5 in which said electrical quantity is an electrical signal the magnitude of which controls the power output of said control means.

9. A method of controlling as defined in claim 8 in which said magnitude is controlled.

10. In control apparatus for controlling an electrostatic precipitator, the combination of: a transformer including primary and secondary windings; rectifying means operatively connected between said secondary winding and an electrostatic precipitator to supply direct operating potentials to the electrodes thereof; and control means operatively connected between said primary winding and a source of alternating current, said control means being operative to supply energy therethrough from said source during a selected portion of each half cycle of the alternating current supplied by said source to maintain said precipitator at normal operating potentials between occurrences of sparking of said precipitator, said control means being operative after sparking of said precipitator to supply energy therethrough during a controllable portion of at least a half cycle of said source of alternating current supplied after said sparking, and said controllable portion passing increased electrical energy therethrough which is sufficient to recharge said precipitator to normal operating potentials after said sparking.

11. The combination of claim 10 wherein: said control means including, a pair of controlled switching devices which are rendered conductive by the application of gating signals thereto, said devices being operatively connected between said source and said primary winding and being oppositely poled to provide, respectively, a conductive path therethrough in opposite directions during alternate half cycles of the alternating current supplied by said source, said pulses means for generating said gating signals and applying said gating signals to said devices to cause conduction of said devices respectively during said selected portion between sparking of said precipitator and to cause conduction of said devices respectively during said controllable portion after sparking of said precipitator.

12. The combination of claim 11 wherein: said pulse means including, generating means for generating said gating signals at a selected time during each half cycle of said source during the normal operaton of said precipitator between occurrences of sparking and for generating said gating signals at a controllable time in at least a half cycle following sparking in response to spark indicator signals, and spark recognition means for generating said spark indicator signals and applying said spark indicator signals to said generating means so that said pulse means applies said gating signals to said controlled switching devices to cause conduction thereof during said controllable period after sparking of said precipitator.

13. The combination of claim 12 wherein:
said pair of controlled switching devices each comprise a controlled rectifier having anode, cathode and gate electrodes, the anode electrode of each of said rectifiers being connected to the cathode electrode of the other of said rectifiers, said gate electrodes operatively connected to receive said gating signals, said controlled rectifiers being rendered conductive from anode to cathode depending upon the half cycle of said alternating source being applied thereto at that time.

14. The combination of claim 10 wherein: said control means being electrically energized from a source of direct current, said control means including, an impedance element operatively connected across said primary winding, and a saturable reactor including an alternating current winding operatively connected between said source of alternating current and said primary winding and a direct current winding operatively connected to said source of direct current, said direct current source being of a selected value to supply sufficient direct current to bias said saturable reactor so that said reactor is saturated during said selected portion to permit the passage of energy therethrough to maintain said precipitator at normal operating potentials between occurrences of sparking, said saturable reactor being saturated earlier in at least said half cycle after sparking of said precipitator during said controlled portion since said impedance element is substantially short circuited after sparking to impress more voltage across said alternating current windings than under normal operating conditions between occurrences of sparking.

15. The combination of claim 14 wherein:
said primary winding being selected to have a relatively high impedance during normal operating periods between sparking of said precipitator compared to the impedance of said alternating current winding measured when said saturable reactor is unsaturated, said impedance element being selected to have a relatively high impedance compared to the rated impedance of said transformer.

References Cited

UNITED STATES PATENTS

| 2,697,813 | 12/1954 | Stone | 323—89 X |
| 2,742,104 | 4/1956 | Hall | 55—105 X |
| 2,798,571 | 7/1957 | Schaelchlin et al. | 55—105 |
| 2,822,507 | 2/1958 | Mulhern | 315—106 |
| 2,838,688 | 6/1958 | Loewe | 323—121 X |
| 2,978,065 | 4/1961 | Berg | 55—110 X |
| 3,039,253 | 6/1962 | Van Hoesen et al. | 323—1 X |
| 3,152,451 | 10/1964 | Downs | 62—3 |
| 3,243,689 | 3/1966 | Perrins | 321—18 X |
| 3,262,045 | 7/1966 | Hauck | 321—16 |
| 3,270,270 | 8/1966 | Yenisey | 321—18 |
| 3,304,487 | 2/1967 | McCaskey, Jr. | 321—19 |
| 3,333,178 | 7/1967 | Van Allen et al. | 321—38 |
| 3,354,375 | 11/1967 | Poppinger et al. | |

FOREIGN PATENTS

| 248,429 | 10/1963 | Australia. |
| 690,718 | 7/1964 | Canada. |

HARRY B. THORNTON, Primary Examiner
D. E. TALBERT, JR., Assistant Examiner

U.S. Cl. X.R.

55—105, 139; 315—111, 326, 363; 321—16; 323—22, 89